United States Patent
Wang et al.

(10) Patent No.: US 7,275,834 B2
(45) Date of Patent: Oct. 2, 2007

(54) AIR GUIDE PLATE AND LAMP ASSEMBLY UTILIZING THE SAME

(75) Inventors: Yen-Lin Wang, Taipei (TW); Hung-Wen Liu, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 147 days.

(21) Appl. No.: 11/067,739

(22) Filed: Mar. 1, 2005

(65) Prior Publication Data

US 2005/0195607 A1 Sep. 8, 2005

(30) Foreign Application Priority Data

Mar. 3, 2004 (TW) .............................. 93105489 A

(51) Int. Cl.
  *G03B 21/16* (2006.01)
  *G03B 21/00* (2006.01)
  *F24F 7/00* (2006.01)
  *F24F 13/06* (2006.01)
  *F21V 29/00* (2006.01)

(52) U.S. Cl. .......................... 353/61; 353/122; 353/60; 454/309; 362/294; 362/373

(58) Field of Classification Search ................. 353/61, 353/57, 52, 122, 60; 454/309; 362/294, 362/373
See application file for complete search history.

(56) References Cited

U.S. PATENT DOCUMENTS

| | | | | |
|---|---|---|---|---|
| 3,019,701 A | * | 2/1962 | Brueckner et al. | ............ 353/61 |
| RE37,880 E | * | 10/2002 | Fujimori | ...................... 353/119 |
| 6,793,343 B2 | * | 9/2004 | Nakano et al. | ................ 353/61 |
| 6,976,760 B2 | * | 12/2005 | Ito et al. | ........................ 353/61 |

* cited by examiner

*Primary Examiner*—W. B. Perkey
*Assistant Examiner*—Magda Cruz
(74) *Attorney, Agent, or Firm*—Birch, Stewart, Kolasch & Birch, LLP

(57) ABSTRACT

A lamp assembly and an air guide plate thereof. The lamp assembly and the air guide plate are positioned in a projector. The lamp assembly comprises a base with a bottom portion and an opening, and a lamp with a bulb disposed at the bottom portion in a manner such that it extends toward the opening. The air guide plate comprises a body, a first guide portion, a second guide portion, and a third guide portion. The first guide portion substantially extends between the bulb and the bottom portion. The second guide portion substantially extends toward the bulb. The third guide portion substantially extends between the bulb and the opening.

10 Claims, 6 Drawing Sheets

AIR GUIDE PLATE AND LAMP ASSEMBLY UTILIZING THE SAME

BACKGROUND

The invention relates to a lamp assembly and an air guide plate thereof, and in particular, to a lamp assembly with an air guide plate controlling lamp temperature.

In a projector, a heat dissipation system maintains a working temperature of a lamp assembly, thus extending lifetime of the lamp assembly. Specifications and testing parameters of working temperatures of the lamps are defined by the manufacturer. When projectors are manufactured, heat dissipation systems thereof must provide sufficient heat dissipation to maintain the working temperature of the lamp assemblies thereof according to specifications.

FIG. 1 is a schematic view of a conventional lamp assembly 200. To avoid damage, the lamp assembly 200 is covered by thermal-isolation material 210 on its front. Additionally, since the working temperature of a bulb 220 is about 1000° C., the bulb 220 needs to be force-cooled by a fan. An air guide plate 240, guiding airflow from the fan, is disposed on an inlet 230 of the lamp assembly 200. Moreover, since power (watts) of the lamp increases with brightness, the requirement for heat dissipation increases accordingly.

As a result, the specification of the working temperature of the lamp becomes complicated. Specifically, the number of test position for the bulb is increased to three from one. Referring to FIG. 2, the range of the working temperature for the bulb 220 is about 927° C. ±30° C. The range of the working temperature for a front foil 250 and a rear foil 260 is below 350° C. That is, the ranges for different positions are different. Furthermore, the distance among the bulb 220, the front foil 250, and the rear foil 260 is less than 20 mm.

It is important to properly design the air guide plate to meet the temperature ranges for different positions. As stated above, since the conventional test position for the lamp is one, the working temperature can be repeatedly tested by adjusting airflow and flow direction thereof. Nevertheless, it is noted that adjustment of the airflow is limited due to noise. Thus, the adjustable variable is limited.

Furthermore, since the conventional air guide plate 240 comprises a single guide portion 241, it cannot be applied in the newly-designed lamp. Specifically, the air guide plate 240 cannot meet the ranges at three positions due to limited variables.

SUMMARY

Accordingly, an embodiment of the invention provides a projector comprising a fan and a lamp assembly. The lamp assembly is disposed near the fan, and comprises an air guide plate and a bulb. The air guide plate comprises a plurality of guide portions to guide airflow from the fan to the bulb.

It is understood that the air guide plate may be made of sheet metal.

Furthermore, the lamp assembly comprises a base located near an inlet of the fan. The air guide plate is disposed on the base. The air guide plate comprises a fixed portion connected to the base. The base comprises a post. The fixed portion comprises a notch corresponding to the post. The air guide plate is fixed on the base by melting the post in the notch. The base comprises a protrusion. The fixed portion comprises a hole corresponding to the protrusion. The air guide plate is fixed to the base by engaging the protrusion with the hole. The air guide plate comprises an abutment portion abutting the base.

A lamp assembly is also provided, comprising a base, a bulb, and an air guide plate. The base comprises an inlet. The bulb is disposed in the base. The air guide plate is disposed in the inlet of the base, and comprises a plurality of guide portions extending toward the bulb.

An air guide plate for a lamp assembly with a base and a lamp is further provided. The base comprises a bottom portion and an opening. The lamp comprises a bulb disposed at the bottom portion in a manner such that the bulb extends toward the opening. The air guide plate comprises a body, a first guide portion, a second guide portion, and a third guide portion. The body is disposed on the base. The first guide portion is integrally formed with the body, and substantially extends between the bulb and the bottom portion. The second guide portion is integrally formed with the body, and substantially extends toward the bulb. The third guide portion is integrally formed with the body, and substantially extends between the bulb and the opening.

It is noted that a protruding end of the first guide portion may be curved. Additionally, the area of the first guide portion is substantially equal to the sum of the area of the second and third guide portions.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and not limitative of the present invention, and wherein.

DETAILED DESCRIPTION

Figure 1:
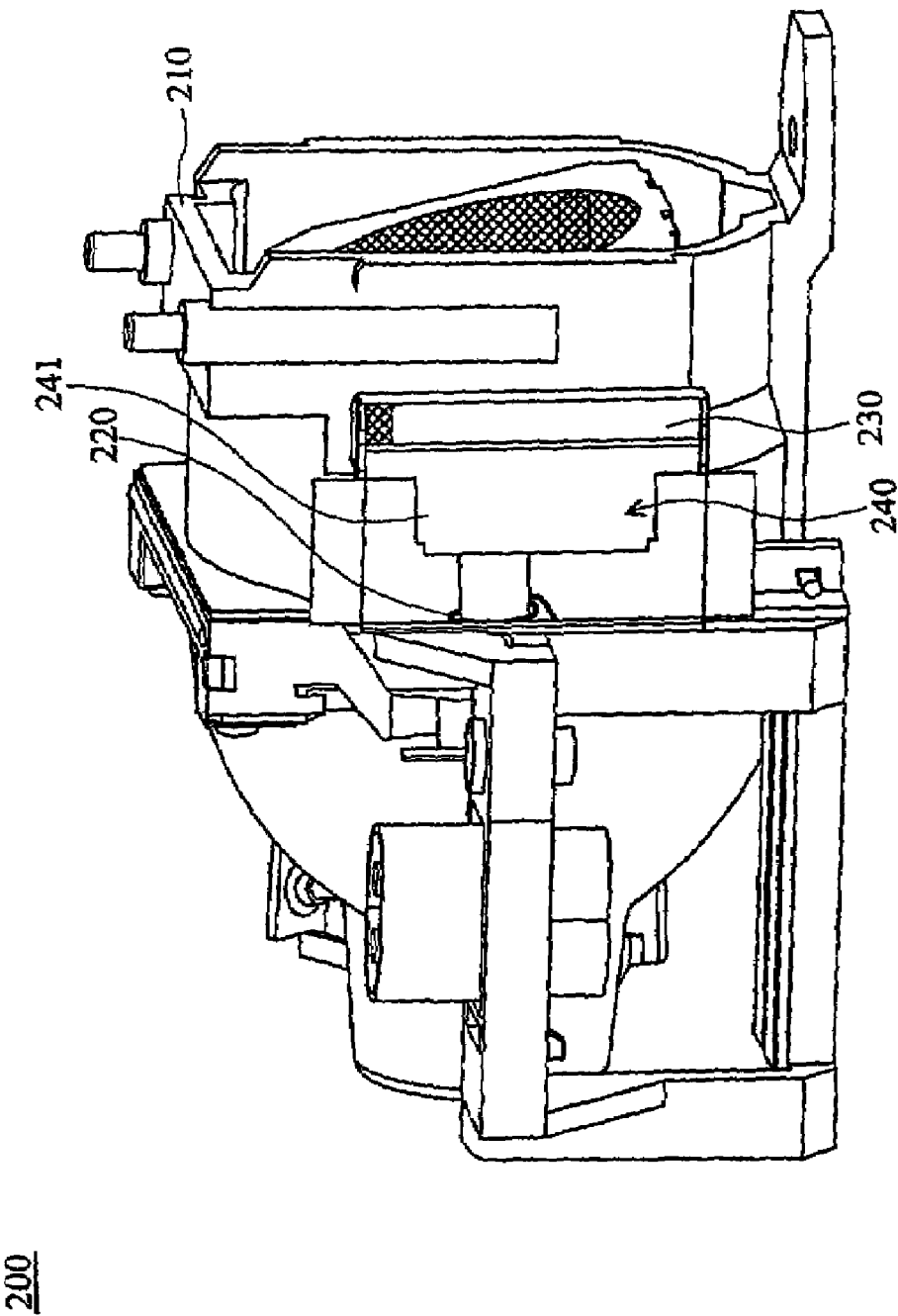
FIGS. 1-2 are schematic views of a conventional lamp assembly.
Figure 2:
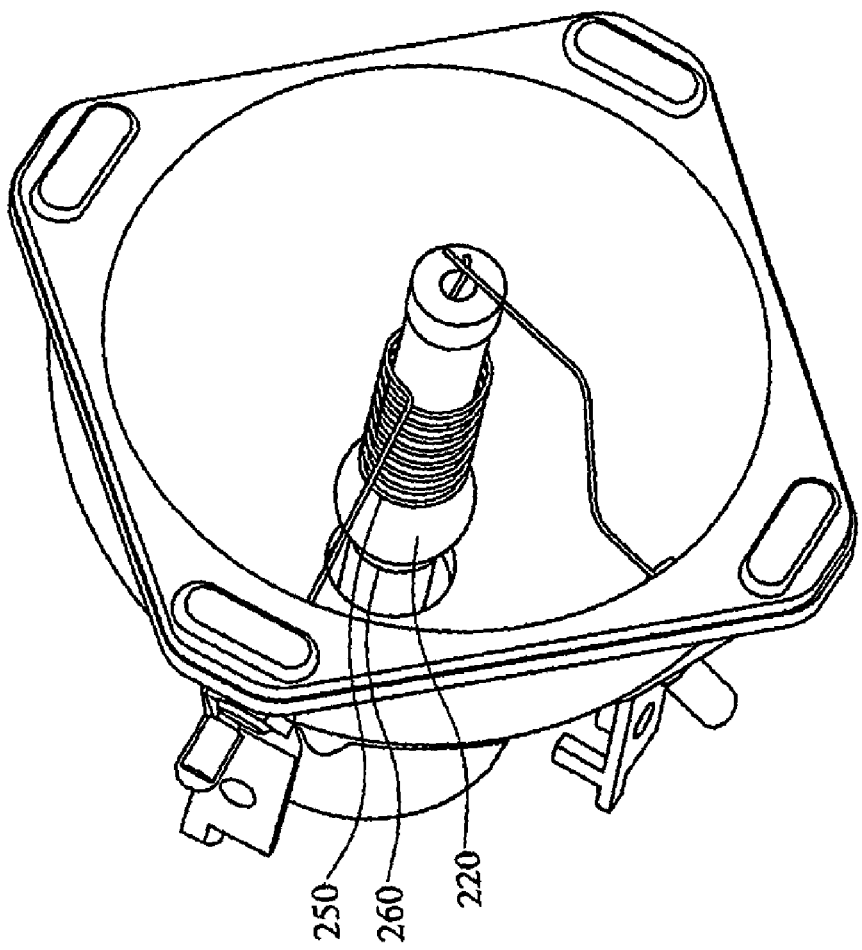
Figure 3:
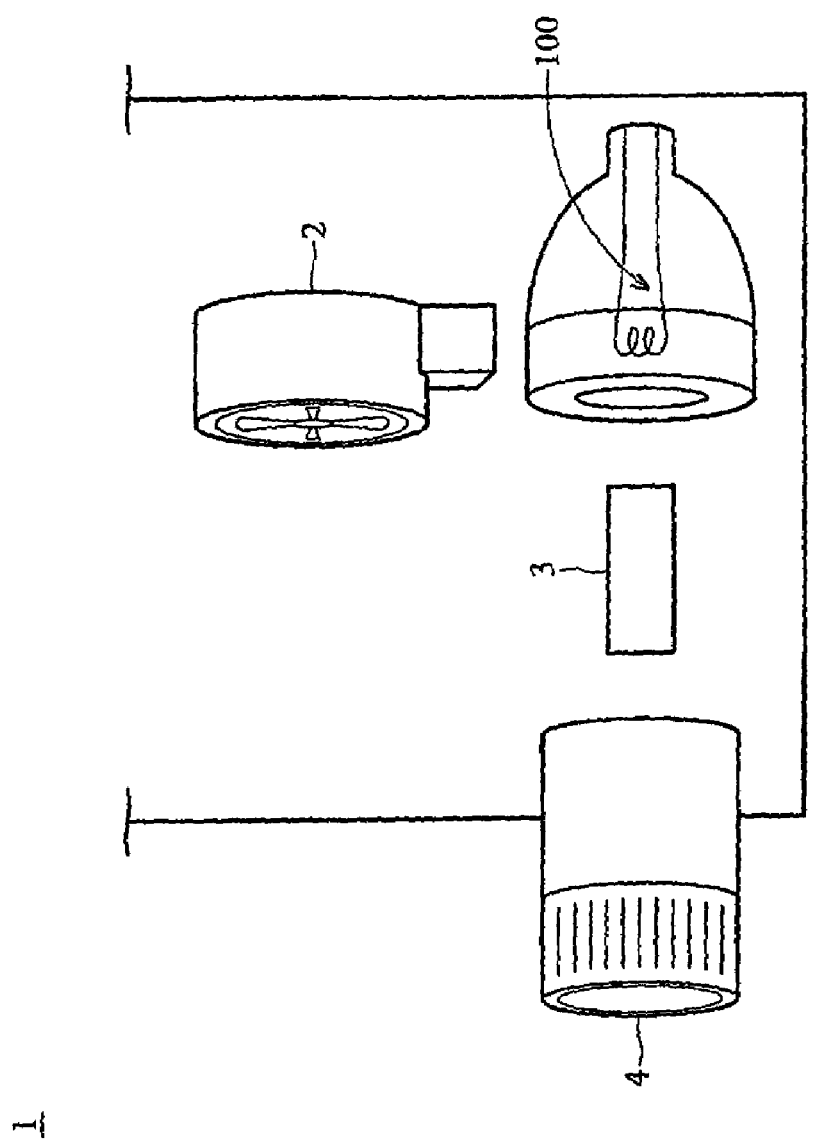
FIG. 3 is a schematic view of a projector as disclosed in an embodiment of the invention.

FIG. 3 shows a projector 1 as disclosed in an embodiment of the invention. The projector 1 comprises a fan 2, a lamp assembly 100, a light pipe 3, and lens 4.

Figure 4A:
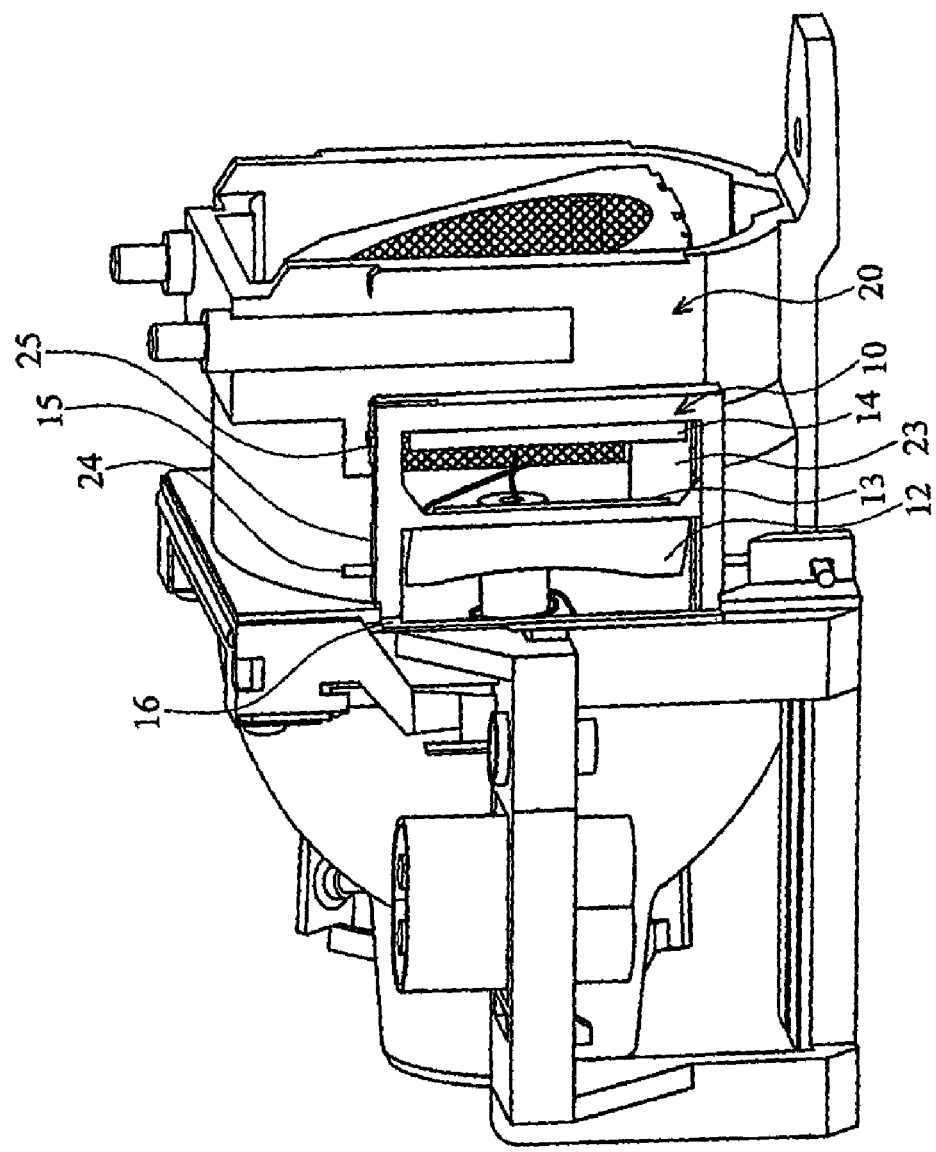
FIGS. 4a-4b are schematic views of a lamp assembly as disclosed in the an embodiment of invention.
Figure 4B:
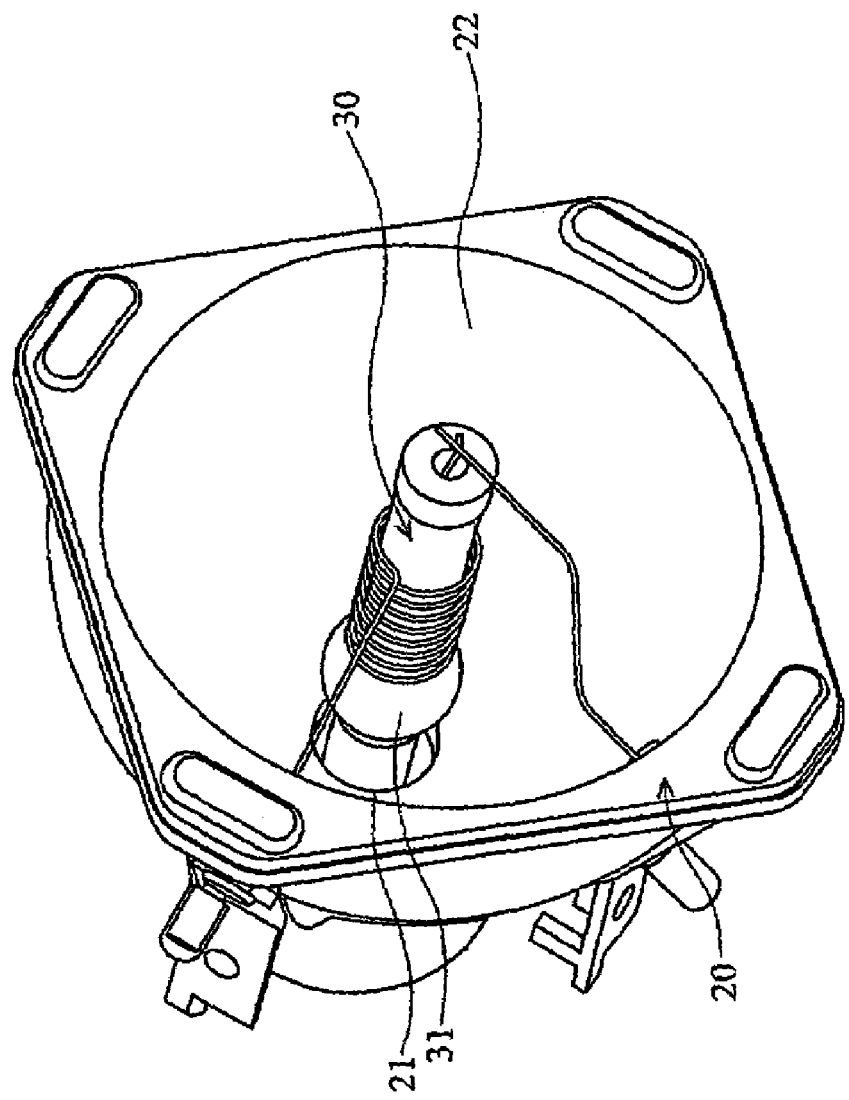

The lamp assembly 100 is disposed near the fan 2, and comprises an air guide plate 10, a base 20, and a bulb 30, as shown in FIGS. 4a-4b. The base 20 comprises a bottom portion 21 and an opening 22, and has an inlet 23 at one side near the fan 2. Additionally, the base 20 comprises a post 24 and a protrusion 25 at the top and the bottom of the inlet 23 respectively.

The lamp 30 comprises a bulb 31 disposed at the bottom portion 21 of the base 20 in a manner such that the bulb 31 extends toward the opening 22 of the base 20.

Figure 5:
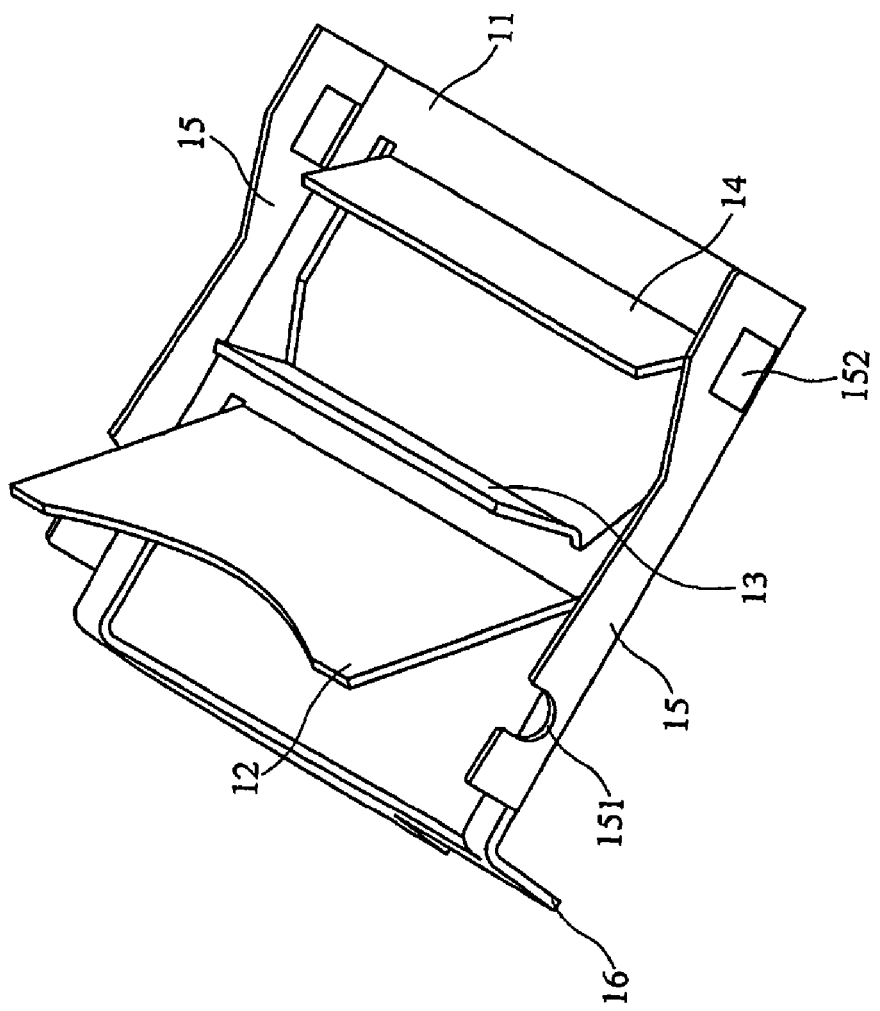
FIG. 5 is a schematic view of an air guide plate as disclosed in an embodiment of the invention.

The air guide plate 10 is disposed at the inlet 23 of the base 20 to guide airflow from the fan 2 to the bulb 31 of the lamp 30. As shown in FIG. 5, the air guide plate 10 comprises a body 11, a first guide portion 12, a second guide portion 13, a third guide portion 14, two fixed portions 15, and an abutment portion 16.

Referring to FIG. 5, the body 11 is disposed on the base 20 via the fixed portions 15 and the abutment portion 16. The first guide portion 12 is integrally formed with the body 11, and substantially extends between the bulb 31 and the bottom portion 21 of the base 20. The second guide portion 13 is integrally formed with the body 11, and substantially extends the bulb 31. The third guide portion 14 is integrally formed with the body 11, and substantially extends toward between the bulb 31 and the opening 20 of the base 20.

The first guide portion 12 substantially extends toward the bottom of the bulb 31 (the bottom portion 21), the third guide portion 14 substantially extends toward the top of the bulb 31 (the opening 22), and the second guide portion 13 substantially extends between the first guide portion 12 and the third guide portion 14. That is, when the position of the first guide portion 12 is adjusted, the temperature around the bottom of the bulb 31 is mainly affected. When the position of the third guide portion 14 is adjusted, the temperature around the top of the bulb 31 is mainly affected. It is understood that this description is used only as a basic principle of the adjustment. In practice, when any of the guide portions is adjusted, the temperature at every portion of the bulb 31 is affected.

Furthermore, as shown in FIG. 5, a protruding end of the first guide portion 12 is curved so that light beams from the lamp 30 can propagate without interference. Additionally, the area of the first guide portion 12 is substantially equal to the sum of the areas of the second guide portion 13 and the third guide portion 14.

The fixed portion 15 of the air guide plate 10 is connected to the base 20, and comprises two notches 151, corresponding to the posts 24 of the base 20, and two holes 152 corresponding to the protrusions 25 of the base 20. The air guide plate 10 is fixed on the base 20 by melting the posts 24 in the notches 151 and engaging the protrusions 25 with the holes 152.

The abutment portion 16 of the air guide plate 10 abuts the base 20 so that the air guide plate 10 can be stably held on the base 20.

It is noted that the air guide plate 10 may be made of sheet metal to be conveniently adjusted during test.

In an embodiment of the invention, the temperature at different positions of the lamp assembly can be adjusted by adjusting angles, positions, and lengths of three guide portions of the air guide plate. Thus, the specification of the lamp assembly can be satisfied by the design of the air guide plate.

Moreover, since the air guide plate is made of sheet metal, it can be directly bent to adjust its angle during testing, thus reducing test time. Additionally, compared with the air guide plate made by injection molding, time and cost for manufacturing the air guide plate made of sheet metal is less when the design thereof is changed.

While the invention has been described by way of example and in terms of an embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector comprising:
a fan; and
a lamp assembly, comprising an air guide plate, a base and a bulb, disposed near the fan, wherein the base comprises a bottom portion and an opening, the bulb is disposed at the bottom portion in a manner such that the bulb extends toward the opening, the air guide plate comprises a plurality of guide portions to guide airflow from the fan to the bulb, one of the plurality of guide portions substantially extends toward the bottom portion, and one of the plurality of guide portions substantially extends toward the opening.

2. The projector as claimed in claim 1, wherein the air guide plate is made of sheet metal.

3. The projector as claimed in claim 1, wherein the base, comprises an inlet near the fan, and the air guide plate is disposed at the inlet.

4. The projector as claimed in claim 1, wherein the air guide plate comprises an abutment portion abutting the base.

5. The projector as claimed in claim 1, wherein the air-guide plate comprises a fixed portion connected to the base.

6. The projector as claimed in claim 4, wherein the base comprises a post, the fixed portion comprises a notch corresponding to the post, the air guide plate is fixed on the base by melting the post in the notch.

7. The projector as claimed in claim 5, wherein the base comprises a protrusion, the fixed portion comprises a hole corresponding to the protrusion, and the air guide plate is fixed on the base by engaging the protrusion with the hole.

8. The projector as claimed in claim 1, wherein the plurality of guide portions comprise a first guide portion substantially extending between the bulb and the bottom portion, a second guide portion substantially extending toward the bulb, and a third guide portion substantially extending between the bulb and the opening.

9. The projector as claimed in claim 8, wherein a protruding end of the first guide portion is curved.

10. The projector as claimed in claim 8, wherein the area of the first guide portion is substantially equal to the sum of the areas of the second and third guide portions.

* * * * *